Patented June 3, 1930

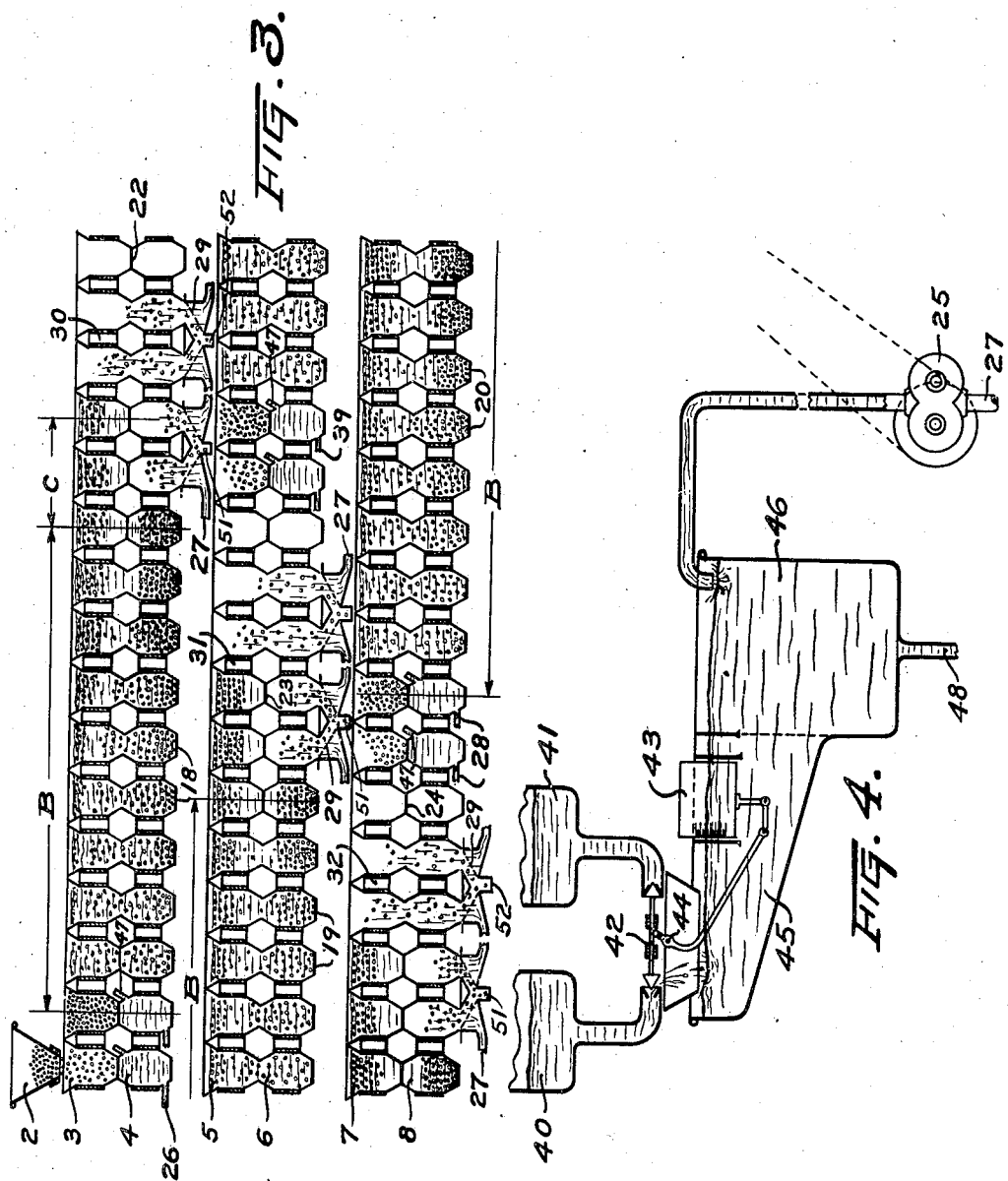

1,761,788

UNITED STATES PATENT OFFICE

OSWALD H. HANSEN, OF CEDARBURG, WISCONSIN, ASSIGNOR TO HANSEN CANNING MACHINERY CORPORATION, OF CEDARBURG, WISCONSIN, A CORPORATION OF WISCONSIN

APPARATUS FOR GRADING GRANULAR MATERIAL

Application filed November 17, 1926. Serial No. 148,814.

This invention relates to improvements in the art of grading granular material, and relates more specifically to an improved apparatus for separating granules of material having different specific gravity, from a mass in which the granules are intermingled.

An object of the invention is to provide simple, compact and efficient apparatus for automatically exploiting the process of effectively grading granules of material such as green peas, as to quality.

Laboratory experiments have demonstrated that green peas may be accurately graded as to quality, by depositing batches thereof in brine baths of predetermined density and of absolute quiescence. Depending upon the density of the brine, certain grades of peas will float upon the brine, while the heavier grades will settle, it being essential however, that the liquid in the bath be maintained without appreciable agitation. If the quiescent condition of the liquid is disturbed, the separation is not accurate and the separated grades are not uniform.

It is an object of the present invention to provide an apparatus involving the foregoing principle, of treating granular material such as peas or berries, in successive liquid baths or basins of different density in order to separate grades of progressively increasing weight and of different quality. In accordance with the improvement, the material is preferably treated in successive batches and the separated granules are removed together with the surrounding liquid, in order to avoid undesirable agitation and consequent mixing of the separated grades during removal thereof from the treating basins or pockets. The invention also contemplates various improvements in the construction and operation of apparatus for enabling treatment of successive batches of granular material under conditions of such quiescence as will produce efficient separation or grading. While the apparatus specifically disclosed herein by way of illustration, comprises several series of superimposed treating pockets which are slowly movable about a central axis in order to receive and to discharge batches of the material in successsion and at predetermined intervals, it is not intended to limit the scope by such specific disclosure, and it will be apparent that the pockets may be maintained at rest and the material supply and discharge means together with the valve actuating cams may be advanced about the central axis in order to accomplish analagous results, without departing from the spirit of the invention.

A clear conception of one embodiment of apparatus which is capable of commercially exploiting the process, may be had by referring to the drawings accompanying and forming a part of this specification in which like reference characters designate the same or similar parts in the various views.

Fig. 3 is a diagrammatic development of the treating pockets of the grader shown in Figs. 1 and 2.

Fig. 4 is an enlarged diagrammatic central vertical section through one of the automatic brine proportioning mechanisms, this mechanism alone constituting no part of the present improvement and comprising the subject of copending application Ser. No. 22,731, filed April 13, 1925.

Figure 1:
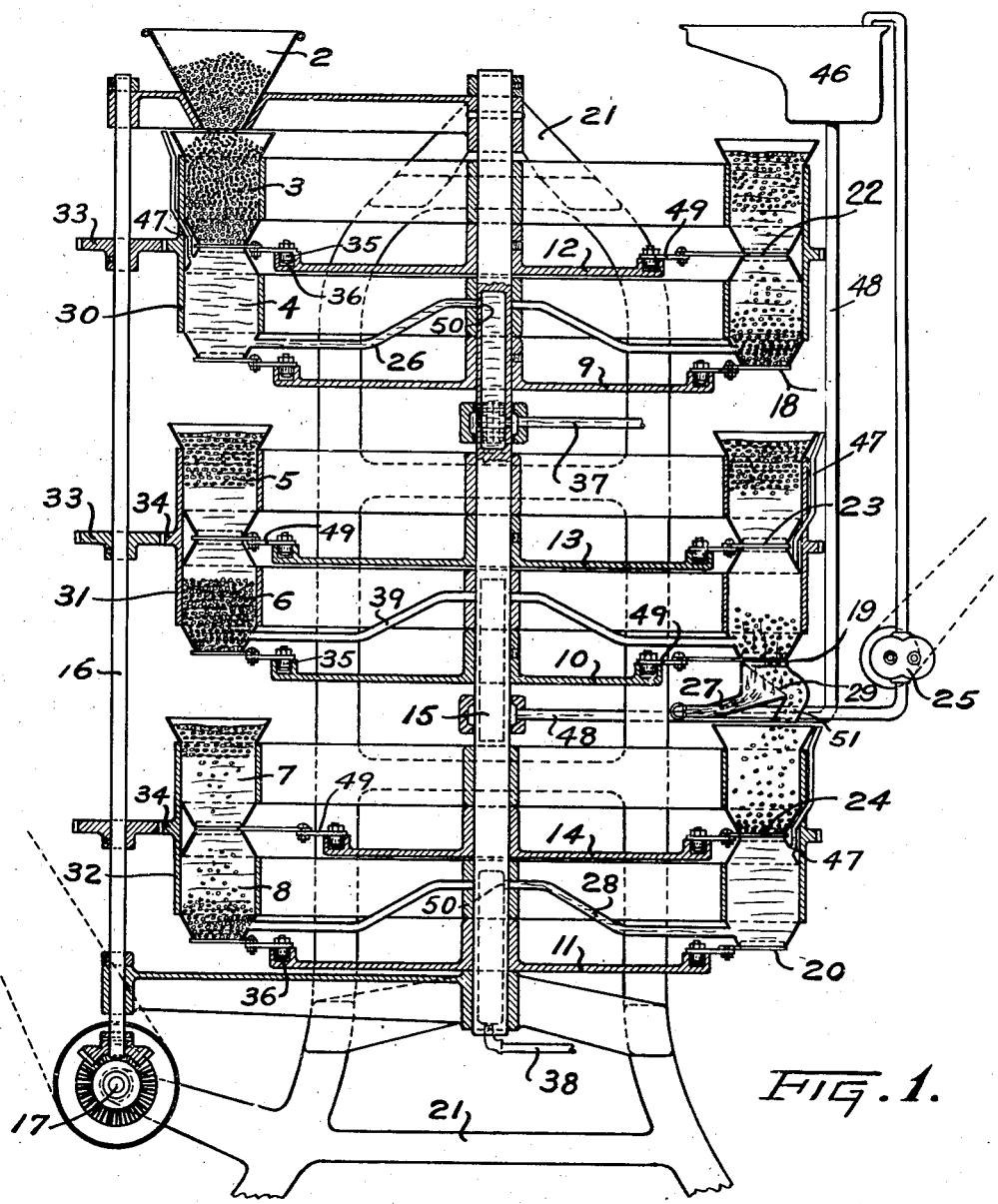
Fig. 1 is a diagrammatic central vertical section through an improved pea grader adapted to automatically separate green peas or the like as to quality.
Figure 2:
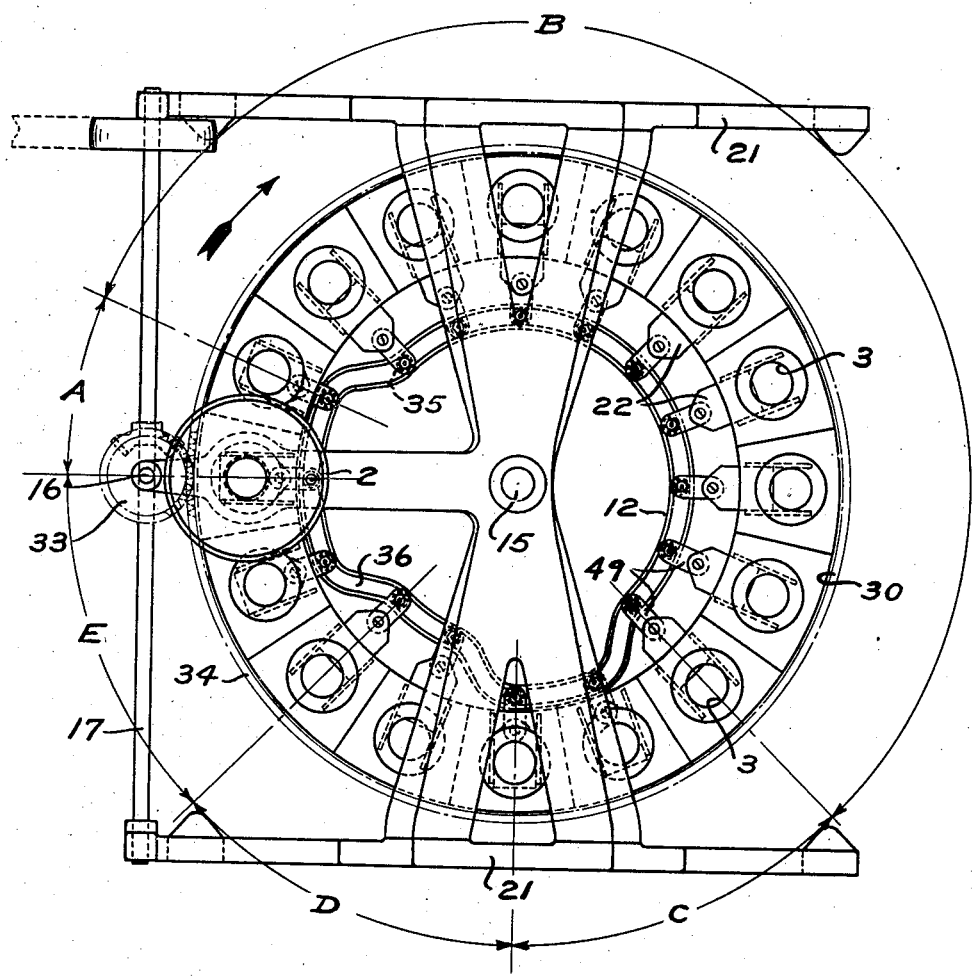
Fig. 2 is a diagrammatic top view of the improved grader shown in Fig. 1, the brine proportioning and supply mechanisms having been omitted.

The specific embodiment of the invention illustrated in the drawings, comprises in general three superimposed annular series of separating pockets simultaneously revolvable about a central vertical axis, means for introducing brine and peas to the successive pockets of each series, means for removing the separated grades of peas from the successive pockets of each series, and mechanism for moving the pockets and for actuating the material introducing and removing means.

The pockets of the upper series are rotatably supported upon the central stationary shaft 15 by means of a spider, and are surrounded by a ring member 30 provided with external gear teeth 34. Each of the upper pockets is divided into top and bottom chambers 3, 4 respectively which may be segregated from each other during portions of each revolution of the series, designated as periods A and C, by means of a radially movable slide or valve 22. The upper ends of the top chambers 3 are constantly open, and the lower end of each bottom chamber 4 is adapted to be sealed by means of a radially movable slide or valve 18 during predetermined portions of each revolution of the series, designated as periods A, B and E. Each of the bottom chambers 4 is also provided with a vent 47 associated with the uppermost portion thereof and preferably extending upwardly to the top of the adjoining chamber 3, the vents 47 being only partially disclosed in Fig. 3 in order to avoid confusion.

The pockets of the intermediate series are also rotatably supported upon the shaft 15 by means of a spider, and are surrounded by a ring member 31 having external gear teeth 34. Each of the intermediate pockets is divided into top and bottom chambers 5, 6 respectively which may be segregated from each other during periods A and C of each revolution, by means of a radially movable slide or valve 23. The upper ends of the top chambers 5 are constantly open, and the lower end of each bottom chamber 6 is adapted to be sealed by means of a radially movable slide or valve 19 during periods A, B and E of each revolution. Each of the bottom chambers 6 is also provided with a vent 47 associated with the uppermost portion thereof and preferably extending upwardly to the top of the adjoining chamber 5, these vents 47 likewise being only partially disclosed in order to avoid confusion.

The pockets of the lower series are likewise rotatably supported upon the shaft 15 by means of a spider, and are surrounded by a ring member 32 having external gear teeth 34. Each of the lower pockets is divided into top and bottom chambers 7, 8 respectively which may be segregated from each other during periods A and C of each revolution, by means of a radially movable slide or valve 24. The upper ends of the top chambers 7 are likewise constantly open, and the lower end of each bottom chamber 8 is adapted to be sealed by means of a radially movable slide or valve 20 during periods A, B and E of each revolution. Each of the bottom chambers 8 is also provided with a vent 47 associated with the uppermost portion thereof and preferably extending upwardly to the top of the adjoining chamber 7, these vents 47 also being only partially shown in order to avoid confusion.

The successive top chambers 3 of the upper pocket series are supplied with granular material from a supply hopper 2 during a period A of each revolution; and the corresponding successive bottom chambers 4 are supplied with a liquid or weak brine solution from a supply pipe 48 through a common pipe 37 and individual radial supply pipes 26 communicable with the pipe 37 through a port 50 in an obvious manner, during the same period. The successive top chambers 5 of the intermediate pocket series are supplied with settled granules from the upper series after separation thereof by a screen 29, by means of a spout 51 during a like period A; and the corresponding successive bottom chambers 6 are supplied with medium strength brine solution from a similar but independent supply tank 46 through a common supply pipe 48 and individual radial pipes 39 as above described. The successive top chambers 7 of the lower pocket series are again supplied with settled granules from the intermediate series after separation thereof by a screen 29, by means of a spout 51 during a similar period A; and the corresponding successive bottom chambers 8 are supplied with strong brine solution from a similar independent supply tank 46 through a common supply pipe 38 and individual radial pipes 28 as previously described. The brine solutions separated from the granules by the screens 29, are delivered from the separators to pipes 27 from which the liquid is returned to its respective supply tank 46 by means of a pump 25.

The mechanism for properly and automatically preparing each brine solution, is shown in Fig. 4, and comprises a brine tank 40, a water tank 41, a proportioning valve 42, a float 43, a valve actuator connecting the float 43 with the proportioning valve 42, and a mixing basin 45 communicating with the conditioned supply tank 46. The arrangement is such that for a predetermined adjustment of the float 43, the proportioning valve 42 will always be adjusted to admit either brine or water in proper proportions to the basin 45 and will thus maintain the solution in the tank 46 at predetermined density.

The stationary main frame 21 besides providing a support for the stationary central shaft 15, also supports the stationary valve actuators 9, 10, 11, 12, 13, 14. The actuators 9, 10, 11, 12, 13, 14 are provided with cam grooves 36 cooperating with rollers 35 which are connected to the valves 18, 19, 20, 22, 23, 24 by means of connectors 49. The three series of pockets are simultaneously rotatable by means of pinions 33 secured to a common drive shaft 16 and meshing with the gear teeth 34. The drive shaft 16 is rotatable from a power shaft 17 through bevel gearing in an obvious manner.

During normal operation of the improved grader in order to exploit the process, the three annular series of superimposed pockets are simultaneously revolved at a relatively slow rate of speed, by the application of rotary motion to the shaft 16. As the successive pockets of the upper series pass beneath the supply hopper 2, the valves 18, 22 are closed and the top chambers 3 are filled with peas while the bottom chambers 4 are simultaneously filled with weak brine solution through the pipes 37, 26 and the port 50. This filling of the chambers occurs during the period A. After the chambers 3, 4 have been thus supplied with granular material and liquid, the cam groove 36 in the actuator 12 become effective to withdraw the valves 22 of the successive pockets and to retain these valves open during the period B. During this period B, the heavier granules settle to the bottom of the bottom chamber 4 while the liquid rises into the top chamber 3 of the corresponding pocket and sustain the floats in this latter chamber. During this settling period, the liquid is in a state of absolute quiescence, and the granules are effectively separated. After the separating period B has been concluded, the successive pockets of the upper series enter the period C when the medial valves 22 are automatically closed and the lower valves 18 are simultaneously opened by the cam grooves 36 in the respective valve actuators 12, 9. During this period C, the settled granules together with the surrounding liquid, are dropped from the bottom chambers 4 upon the separating screen 29, the liquid passing through the screen to the return pipe 27, and the removed granules being delivered into the top chambers 5 of the intermediate pocket series. After the bottom chambers 4 have been thus emptied, the successive pockets enter the period D during which the medial valves 22 are opened and the lower valves 18 remain opened, thereby permitting the floats together with the surrounding liquid to drop through the adjoining bottom pockets 4 upon similar separating screens 29. These latter screens permit the liquid to pass therethrough to a return pipe 27, and discharge the separated floats through a chute 52 to a bin at the side of the machine. The floats thus removed include thistle buds and lighter granules, and ordinarily constitute waste material. During the succeeding period E, the valves 18, 22 are properly positioned preparatory to entry to the period A of a succeeding cycle.

The settled granules delivered to the pockets of the intermediate series pass through a similar cycle of periods being treated by means of a medium brine solution to remove the floats from the settled granules. The floats thus removed in the intermediate series, constitute a final grade of highest or first quality, and the settled granules are automatically delivered to and treated in the pockets of the lower series to again separate the same into two additional and distinctive grades, the floats resulting from this final treatment constituting the second quality and the settlings constituting the third quality. By further treating the third quality material, other distinctive grades may be removed in the same manner, it being necessary however to utilize brine solutions of increasing density during further treatment.

It will thus be noted that the successive grades are automatically removed from the mixture and that each grade is of absolutely uniform quality throughout. It is important that the advancement of the pockets be uniform and that the movement be relatively slow in order to maintain the desired quiescent condition of the basins. It is also desirable to remove the separated granules together with the surrounding liquid in order to prevent subsequent mixing of the grades. The brine proportioning mechanism maintains the admitted liquid at uniform density thereby also insuring uniformity in the grades.

It should be understood that it is not desired to limit the invention to the exact steps of the process or to the details of construction of the apparatus herein shown and described, for various modifications within the scope of the claims may occur to persons skilled in the art.

It is claimed and desired to secure by Letters Patent:—

1. In combination, means forming a series of pockets, means for moving said pockets in a non-vertical plane, means for admitting liquid of definite density to the successive pockets of said series, means for introducing mixed granules of different specific gravity to the successive pockets, means for dividing the successive pockets while in motion into upper and lower chambers to segregate the settled granules from the floats, and means for removing the separated materials from the successive pockets together with the liquid.

2. In combination, means forming an annular series of pockets having a non-horizontal axis of annularity, means for slowly revolving said series about said axis of annularity, means for introducing granular material and liquid to said pockets in succession, means for dividing the successive pockets while in motion into upper and lower chambers to segregate the settled granules from the floats, and means for removing the separated materials from the pockets.

3. In combination, means forming a series of pockets, means for dividing each of said pockets into segregated chambers, means for permitting escape of air from the lower of said chambers, means for admitting liquid to the lower of said chambers in succession and from the lower of said chambers past said dividing means into the upper of said chambers, and means for introducing granular material into said liquid through the upper of said chambers.

4. In combination, means forming upper and lower superimposed annular series of pockets, means for introducing granular material and brine to the successive pockets of said upper series to separate the floats from the heavier granules, and means for subsequently introducing the settled heavier granules and a stronger brine solution to the successive pockets of said lower series to further separate the granules into grades of different gravity.

5. In combination, means forming upper and lower superimposed annular series of pockets, means for simultaneously revolving said series about an axis, means for introducing liquids of different density to the pockets of the several series, and means for passing granular material through the liquid filled pockets in succession.

6. In combination, means forming an annular series of independent pockets, means for revolving said pockets about an axis, means for introducing granular material into corresponding ends of the successive pockets of said series from above, means for introducing liquid into the successive pockets of said series from below to separate said granular material into grades, and means for subsequently removing the separated grades of said granular material from the opposite corresponding ends of said pockets.

7. In combination, means forming an annular series of independent pockets, means for revolving said pockets about an axis, means for introducing granular material into corresponding ends of the successive pockets of said series from above and while said pockets are in motion, means for introducing liquid into the successive pockets of said series while in motion to separate said granular material into grades, and means for subsequently removing the liquid and the separated grades of said granular material from the opposite corresponding ends of said pockets while in motion.

8. In combination, means forming an annular series of independent pockets, means for revolving said pockets about an axis, a common supply for introducing equal batches of granular material into corresponding ends of the successive pockets of said series from above, a common source of supply for introducing liquid into the successive pockets of said series to separate said granular material into grades, and means for subsequently removing the separated grades of said granular material from the opposite corresponding ends of said pockets at a common point.

9. In combination, means forming a series of pockets, means for introducing granular material and liquid into upper and lower end portions respectively of successive pockets of said series, means for moving said pockets while said granular material and liquid are confined therein to permit gravity separation of the floats from the heavier granules in each pocket, and means for subsequently removing the separated grades of said granular material through the lower end portion of each pocket.

10. In combination, means forming a pocket movable about an axis, means for introducing granular material to said pocket through one end thereof while said pocket is in motion, means for subsequently admitting liquid to said pocket to separate said granular material into grades, means for segregating said pocket into separated chambers, and means for subsequently removing the several grades in succession from one of said chambers through the opposite end of said pocket.

11. In combination, means forming a pocket movable about an axis, means for introducing granular material to said pocket through one end thereof, means for admitting liquid to said pocket through the opposite end thereof to separate said granular material into grades, means for segregating said pocket into separated chambers, and means for subsequently removing the several grades in succession from one of said chambers through said opposite end.

12. In combination, means forming a series of pockets having upper and lower ends movable in superimposed planes, means for admitting liquid to the successive pockets of said series, means for introducing mixed granules of different specific gravity into the upper ends of the successive pockets, means for dividing the successive pockets into upper and lower chambers while in motion, and means for removing said liquid and granules from said pockets through the lower ends thereof.

13. In combination, means forming an annular series of pockets having upper and lower open ends movable in superimposed parallel planes, means for admitting liquid to said pockets in succession, means for introducing mixed granules of different specific gravity into the upper open ends of successive pockets, means for segregating said pockets into upper and lower chambers, and means for successively removing the contents of said chambers through the lower open ends of said pockets.

14. In combination, means forming a series of pockets having upper and lower ends movable in superimposed planes, means for admitting liquid and granular material into said pockets while in motion, means for dividing said pockets into segregated compartments each containing some of the liquid and granular material, and means for successively removing the contents of said chambers of each pocket through the lower end thereof.

In testimony whereof, the signature of the inventor is affixed hereto.

OSWALD H. HANSEN.